UNITED STATES PATENT OFFICE.

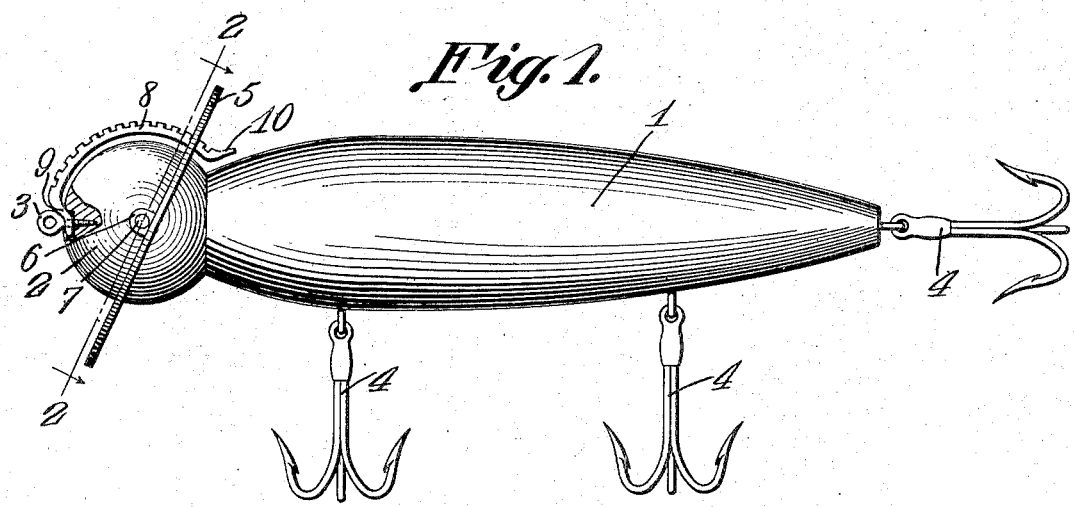
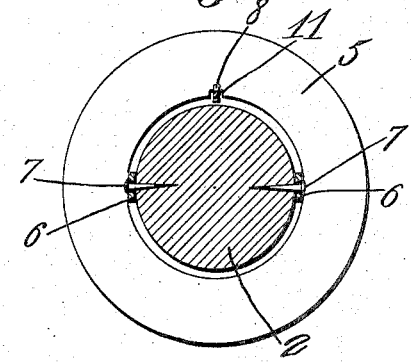

ARTHUR BURKMAN, OF TRAVERSE CITY, MICHIGAN.

ARTIFICIAL BAIT.

1,232,211.      Specification of Letters Patent.      Patented July 3, 1917.

Application filed February 24, 1916. Serial No. 80,228.

*To all whom it may concern:*

Be it known that I, ARTHUR BURKMAN, a citizen of the United States, residing at Traverse City, in the county of Grand Traverse and State of Michigan, have invented a new and useful Artificial Bait, of which the following is a specification.

The present invention appertains to artificial baits, and is particularly an improvement over the artificial bait disclosed in my Patent No. 1,155,883 granted October 5, 1915.

It is the object of the invention to provide an artificial fishing bait having novel means whereby the motions of the bait in the water can be controlled, the bait being made to dive to different depths by the same velocity thereof, and being made to wiggle or skip.

It is also within the scope of the invention to provide an artificial bait of the nature above indicated which is exceedingly simple and inexpensive in construction, and possessing a marked degree of utility.

With the foregoing and other objects in view which will appear as the description proceeds, the invention resides in the combination and arrangement of parts and in the details of construction hereinafter described and claimed, it being understood that changes in the precise embodiment of the invention herein desclosed can be made within the scope of what is claimed without departing from the spirit of the invention.

The invention is illustrated in the accompanying drawing, wherein:—

Figure 1 is a side elevation of the improved bait.

Fig. 2 is a section on the line 2—2 of Fig. 1.

The artificial bait embodies a buoyant body 1 of wood or other suitable material, which is suitably finished, and the body 1 is provided at its forward end with a spherical head 2 provided with a screw eye or attaching element 3 for the attachment of the fishing or trolling line. Loosely connected to the body 1 are a plurality of hooks 4 to catch the fish which attempts to bit or swallow the bait.

A flat ring or annulus 5 surrounds the head 2, and is provided at its inner edge and at diametrically opposite points with angularly extending ears 6 projecting forwardly from the ring, and bearing against opposite sides of the head 2. Said ears 6 are pivoted to the head 2 by means of tacks or other pivot elements 7 engaged through apertures in the ears 6 and taking into the head 2, whereby the ring or plane member 5 can be swung about a transverse axis relative to the body of the bait, said axis being arranged diametrically relative to the head 2.

As a means for holding the ring 5 at various angular positions, an arcuate notched spring catch 8 has an eye 9 at its forward end embedded in the front portion of the head 2, said catch being disposed above said head, and having a finger piece 10 at its rear end, and the ring 5 has a notch 11 through which the catch 8 extends, said catch projecting rearwardly below the upper portion of the ring and tending to spring upwardly so that one of the notches of the catch engages the ring to hold it fixed relative to the body. The shank of the screw eye 3 is engaged through the eye 9 to clamp the spring catch in place. By pressing the finger piece 10 downwardly toward the head 2, the catch 8 is released from the ring 5, and said ring can then be swung to any desired position within certain limits, and when the ring is brought to the desired position, the catch is released and will then spring into engagement with the ring to hold it in position.

When it is desired to have the bait dive into the water when it is pulled forward by the line, the ring 5 is inclined rearwardly as seen in Fig. 1, so that the ring 5 in moving forwardly against the water, will have the tendency to force the bait downwardly into the water, the depth of submergence being controlled by the inclination of the ring 5, since said ring can be adjusted to various inclinations. The ring 5 can also be brought to a position so that the plane thereof is at right angles with the axis of the body 1, whereby the ring will tend to impede the forward movement of the bait, and this will cause the bait to have a wiggling motion, the bait also having a wiggling motion when diving but not to such a great extent as when the ring 5 is at right angles with the axis of the body. By adjusting the upper portion of the ring 5 until the ring is inclined forwardly, the ring will have a tendency to raise the bait when it is drawn forward, thus causing the bait to skip over the water. It is thus possible to control the depth of diving of the bait and the motion thereof by adjusting the flat ring 5, and the depth to which the bait dives can be controlled irrespective of the velocity at which the bait is moved through the water. In other words, by pulling the bait with the same velocity through the water with the ring 5 arranged at different angles, the depth of diving of the bait is controlled, as will be obvious to those versed in the art.

The ears 6 and pivot elements 7 provide eyes for the head 2, and the ring 5 is preferably nickel plated or otherwise polished to provide a bright surface for attracting or luring the fish.

Having thus described the invention, what is claimed as new is:—

1. An artificial bait comprising a body, a member pivoted thereto for swinging movement about a transverse line and adapted to control the movement of the body when drawn through the water, and a notched spring catch secured to the body and engageable with said member to hold it at various angles relative to the body.

2. An artificial bait comprising a body, a ring surrounding the body and pivoted to opposite sides thereof to swing about a transverse axis, said ring being adapted to control the movement of the body when it is drawn through the water, and an arcuate notched spring catch having one end attached to the body and engageable with said ring to hold it at various angles relative to the body.

3. An artificial bait comprising a body having a spherical head, a ring surrounding said head and pivoted to opposite sides thereof to swing about a transverse axis, said ring being adapted to control the movement of the body when drawn through the water, and an arcuate notched spring catch having one end attached to the head and projecting through the ring to engage the same for holding the ring at various angles relative to the body.

In testimony that I claim the foregoing as my own, I have hereto affixed my signature in the presence of two witnesses.

ARTHUR BURKMAN.

Witnesses:
L. SOULE,
ANNIE SOULE.